(12) United States Patent
Guckes

(10) Patent No.: US 8,356,786 B2
(45) Date of Patent: Jan. 22, 2013

(54) FLEXIBLE LAMINATED SUSPENSION BRACKET FOR COMPOSITE TYPE 4 TANKS

(75) Inventor: Holger Guckes, Kelkheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 931 days.

(21) Appl. No.: 12/137,912

(22) Filed: Jun. 12, 2008

(65) Prior Publication Data
US 2009/0309000 A1 Dec. 17, 2009

(51) Int. Cl.
*F17C 1/16* (2006.01)
*F17C 13/04* (2006.01)
*F16J 12/00* (2006.01)

(52) U.S. Cl. ..................... 248/309.1; 220/325
(58) Field of Classification Search ............... 248/309.1, 248/213.2, 310, 317, 200, 300, 342; 220/325
See application file for complete search history.

(56) References Cited

U.S. PATENT DOCUMENTS

| 3,357,669 | A | | 12/1967 | D'Amato | |
|---|---|---|---|---|---|
| 3,817,564 | A | * | 6/1974 | Baldwin et al. | 292/256.67 |
| 4,155,529 | A | * | 5/1979 | Maudlin | 248/604 |
| 4,379,513 | A | * | 4/1983 | Basterfield et al. | 220/325 |
| 5,470,207 | A | * | 11/1995 | Shockey et al. | 417/313 |
| 5,752,853 | A | * | 5/1998 | Curtindale | 439/567 |
| 6,131,863 | A | * | 10/2000 | Fiacco | 248/200 |
| 7,513,754 | B2 | * | 4/2009 | Clark et al. | 417/360 |
| 2003/0019983 | A1 | * | 1/2003 | Iinuma et al. | 248/200 |

* cited by examiner

*Primary Examiner* — Anita M King
(74) *Attorney, Agent, or Firm* — Fraser Clemens Martin & Miller LLC; J. Douglas Miller

(57) ABSTRACT

A method and apparatus for connecting a vessel to a carrier system includes a vessel having at least one domed end and an annular bracket having an outer peripheral portion including multiple cutouts and swages extending radially outwardly from the outer peripheral portion for fixedly securing the bracket to the domed end of the vessel, and an inner peripheral portion having a pre-tensioned flange for removably securing the bracket to the vessel.

20 Claims, 3 Drawing Sheets

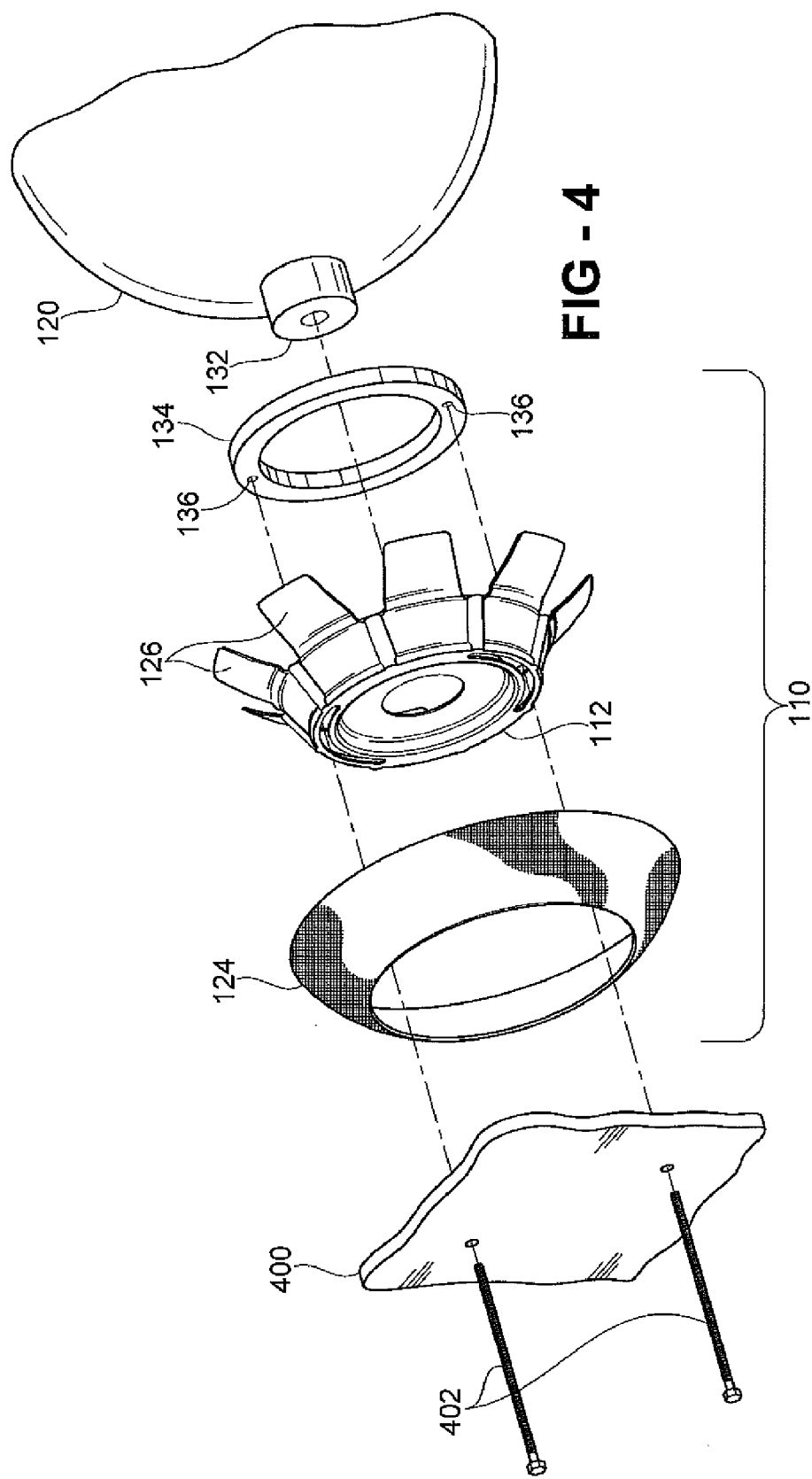

US 8,356,786 B2

FLEXIBLE LAMINATED SUSPENSION BRACKET FOR COMPOSITE TYPE 4 TANKS

FIELD OF THE INVENTION

The present invention relates to a suspension system for connecting a hollow vessel to a carrier system, and more particularly to a flexible laminated suspension bracket for use with any shaped vessel.

BACKGROUND OF THE INVENTION

Fuel cells have been proposed as a power source for electric vehicles and other applications. In proton exchange membrane (PEM) type fuel cells, hydrogen is supplied as a fuel to an anode of the fuel cell and oxygen is supplied as an oxidant to a cathode of the fuel cell. A plurality of fuel cells is stacked together in fuel cell stacks to form a fuel cell system. The fuel is typically stored in large, hollow pressure vessels, such as fuel tanks, disposed on an undercarriage of the vehicle.

Current fuel tanks are manufactured using a filament wound composite method. The pressure vessels are typically multi-layered and include at least an inner shell and an outer shell. Inner shells may be manufactured using a variety of known methods including: injection molding; extrusion blow molding; blow molding; rotational molding; and the like. The inner shell is formed utilizing the rotational molding method by disposing a plurality of bosses in a die cavity with a polymer resin, heating the mold while it is rotated causing the resin to melt and coat walls of the die cavity, cooling the die, and removing the molded inner shell. The finished inner shell is fixed to the bosses at both ends. To form the outer shell, the molded inner shell may undergo a filament winding process.

Generally, the shape of a wound composite vessel depends on a manufacturer and manufacturing tolerances. Manufacturing the vessel using the filament wound composite method restricts the shape of the vessel to a simple geometric shape, such as a cylindrical shape, for example. FIG. 1 illustrates a vessel having a shape as known in the art and having straps and mounting brackets, for connecting the vessel to a carrier system. A disadvantage of this system is that the straps cannot compensate for the expansion of the vessel and may experience additional tension that in turn affects the vessel structure. A still further disadvantage is that the area for mounting the straps may be too small to properly support the straps.

It is desirable to produce a suspension system for connecting a hollow vessel to a carrier system that is versatile for use with vessels having a variety of shapes.

SUMMARY OF THE INVENTION

Consistent and consonant with the present invention, a suspension system that may be used with vessels having a variety of shapes and compensates for manufacturing tolerances and vessel expansion, has surprisingly been discovered.

In one embodiment, a suspension system for connecting a vessel to a carrier system comprises an annular bracket having multiple cutouts and swages extending radially from the outer perimeter of the bracket for securing the bracket to a vessel.

In another embodiment, a suspension system for connecting a vessel to a carrier system comprises a vessel having at least one domed end and an annular bracket having an outer perimeter including multiple cutouts and swages extending radially from the outer perimeter of the bracket for fixedly securing the bracket to the domed end of the vessel and an inner perimeter having a pre-tensioned flange for removably securing the bracket to the vessel.

In another embodiment, a method for connecting a vessel to a carrier system comprises the steps of providing a suspension system including an annular bracket having an outer perimeter with multiple cutouts and swages extending radially from the outer perimeter of the bracket and an inner perimeter having a pre-tensioned flange; providing a vessel having at least one domed end; fixedly securing the cutouts and swages of the bracket to the domed end of the vessel; removably securing the pre-tensioned flange of the bracket to the vessel; and connecting the vessel to a carrier system.

DESCRIPTION OF THE DRAWINGS

The above, as well as other advantages of the present invention will become readily apparent to those skilled in the art from the following detailed description, when considered in the light of the accompanying drawings:

FIG. 4 is a fragmentary exploded perspective view of the suspension system illustrated in FIG. 2.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed and illustrated, the steps presented are exemplary in nature, and thus, the order of the steps is not necessary or critical.

Figure 1:
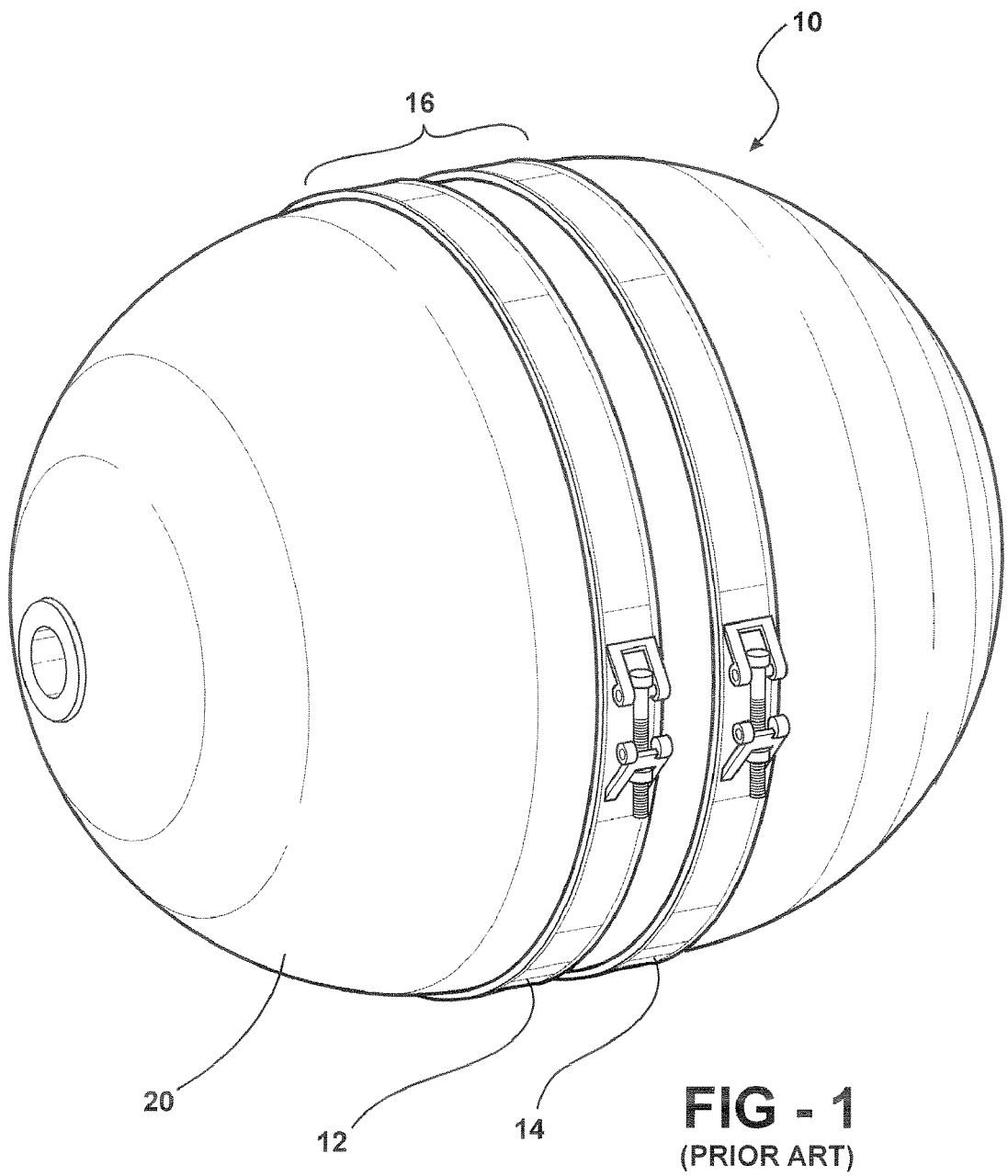
FIG. 1 is a perspective view of a vessel and suspension system used for connecting to a carrier system as known in the art.

FIG. 1 illustrates a suspension system 10 for a vessel 20 that is known in the art. The suspension system 10 comprises straps 12, 14 preferably of stainless steel and coated with an elastomer material that surround a vessel 20 in the cylindrical section 16 of the vessel 20. A disadvantage of this system 10 is that the shape of a vessel 20, particularly a wound composite vessel, is inconsistent and dependent upon the manufacturer and the manufacturing tolerances. Instances may occur where the vessel 20 has a smaller length to diameter ratio, causing the cylindrical section 16 to be too small of an area to mount the straps 12, 14.

A still further disadvantage of this known suspension system 10 is that the vessel 20 expands due to rising pressure and temperature fluctuations, placing additional pressure on the straps 12, 14. Because the straps 12, 14 are fixed, this pressure is transferred to the vessel body structure. Therefore, this system 10 is disadvantageously dependent on manufacturing tolerances and does not compensate for a diameter deviation of the vessel body structure.

Figure 2:
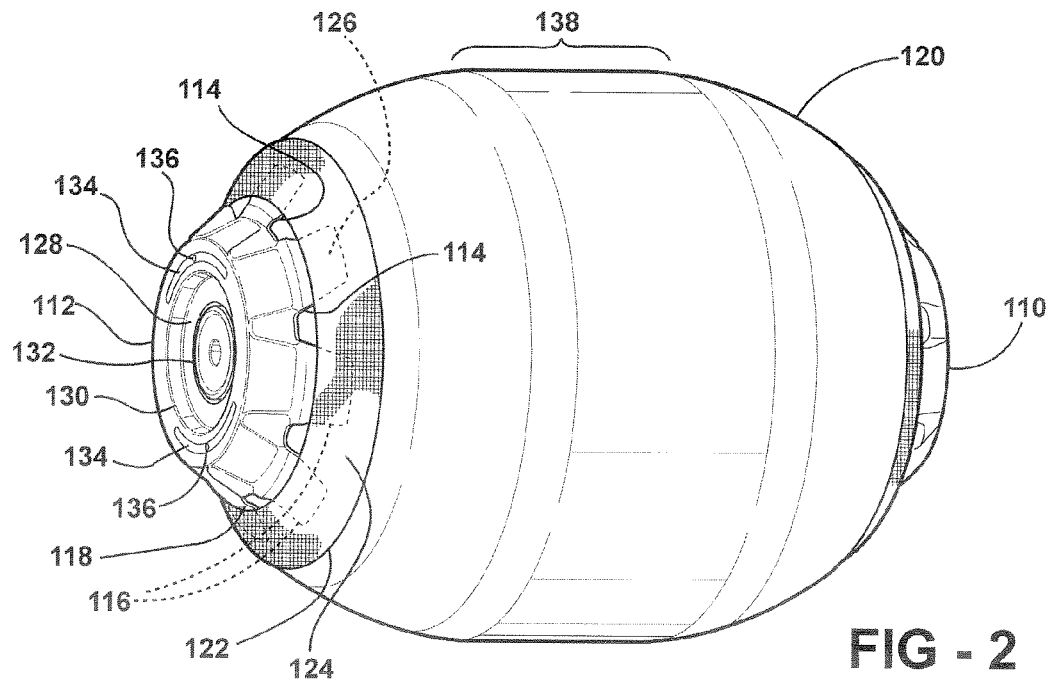
FIG. 2 is a perspective view of a suspension system for use with a vessel according to an embodiment of the invention.
Figure 3:
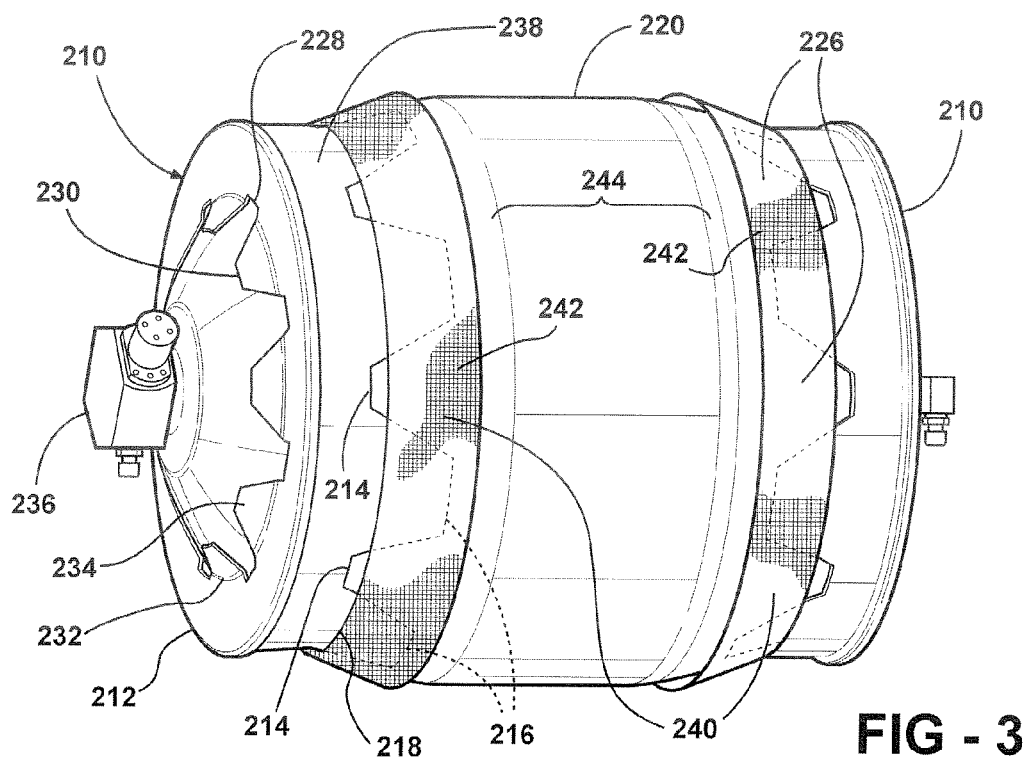
FIG. 3 is a perspective view of a suspension system for use with a vessel according to a second embodiment of the invention.

FIGS. 2-4 illustrate embodiments of the present invention. In FIGS. 2 and 4, a suspension system 110 is shown for connecting a vessel 120 to a carrier system 400. The suspension system 110 includes an annular bracket 112 having multiple cutouts 114 and swages 116 extending substantially radially from an outer peripheral portion 118 of the bracket 112 to form substantially flexible wings 126. The flex of the wings 126 compensates for manufacturing tolerances and vessel expansions. The bracket 112 may be deep drawn and radially laminated onto a dome section 122 of the vessel 120 by any conventional means such as with additional carbon or glass fiber composite layers 124. The lamination layer 124 is wound over the wings 126 of the bracket 112 and fixes the bracket 112 to the vessel 120. The lamination layer 124 is typically located inside the dome section 122 of the vessel 120 where the expansion is less than the expansion of the vessel 120 in the cylindrical section 138. However, other locations can be used as desired. An inner flange 128 extends radially inwardly from an inner peripheral portion 130 of the bracket 112. The flange 128 forms an aperture adapted to facilitate access to a connecting means 132 disposed on the vessel 120. The connecting means 132 facilitates fluid communication between the vessel 120 and a source of fluid (not shown). In the embodiment shown, the inner peripheral portion 130 includes a fastener connection 134 such as an annular metal ring seated within the bracket 112 and having threaded openings 136 for receiving a fastener therein such as a screw 402. The screw 402 connects the vessel 120 to the carrier system 400.

Using the system shown in FIGS. 2 and 4, no straps are required for connecting the vessel 120 to the carrier system 400, essentially decoupling the suspension bracket 112 from the shape of the vessel 120. This decoupling of the suspension bracket 112 from the shape of the vessel 120 avoids a dependency on manufacturing tolerances, while compensating for vessel expansion due to increased pressure. Further, the suspension bracket 112 provides a system for accurately defining a connection surface to minimize assembly complexity. Additionally, the suspension system 110 may be used with vessels having a variety of shapes. Further, the bracket 112 may be used to attach additional components such as valve protection, line fixation, and stone shield connections. The suspension system 110 advantageously compensates for manufacturing variations in size for different vessels while compensating for vessel expansion. Thus, mounting of the vessel to a carrier system 400 is independent of the vessel shape. Still other advantages are that the alignment and mounting of the vessel 120 are simplified.

FIG. 3 shows a suspension system 210 for connecting a vessel 220 to a carrier system (not shown). The suspension system 210 includes an annular bracket 212 having multiple cutouts 214 and swages 216 extending substantially radially outwardly from an outer peripheral portion 218 of the bracket 212 to form substantially flexible outer wings 226. The flex of the outer wings 226 compensates for manufacturing tolerances and vessel expansions. Additionally, multiple cutouts 228 and swages 230 extend substantially radially inwardly from an inner peripheral portion 232 of the bracket 212 to form substantially flexible inner wings 234. The inner wings 234 extend radially inwardly from the inner peripheral portion 232 of the bracket 212 about the connecting means 236 which provides fluid communication between the vessel 220 and a source of fluid. The flex of the inner wings 234 compensates for manufacturing tolerances and vessel expansions. An annular supporting surface 238 extends between the inner and outer peripheral portions 232, 218 of the bracket 212.

The bracket 212 shown is deep drawn, although other production methods can be used. For connection to the vessel 220, the bracket 212 is radially laminated onto a dome section 240 of the vessel 220 by any means such as with additional carbon or glass fiber composite layers 242. The lamination layer 242 is wound over the outer wings 226 of the bracket 212 and fixes the bracket 212 to the vessel 220. Favorable results have been obtained by locating the lamination layer 224 inside the dome section 240 of the vessel 220 where the expansion is less than an expansion of the vessel 220 in the cylindrical section 244. In the embodiment shown, the inner wings 234 form a flanged area that is pre-tensioned for removably securing the bracket 212 to the vessel 220. Straps, such as those illustrated in FIG. 1, may be wrapped about the supporting surface 238 for connecting the vessel 220 to the carrier system, effectively decoupling the suspension bracket 212 from the shape of the vessel 220. The decoupling of the suspension bracket 212 from the shape of the vessel 220 avoids a dependency on manufacturing tolerances, while compensating for vessel expansion due to increased pressure. Further, the suspension bracket 212 provides a system for accurately defining a connection surface to minimize a complexity of assembly. Additionally, this suspension system 210 may be used with vessels having a variety of shapes. Further, the bracket 212 may be used to attach additional components such as valve protection, line fixation, and stone shield connections. The suspension system 210 advantageously compensates for variations in size for different vessels while also compensating for vessel expansion. Thus, mounting of the vessel 220 to the carrier system is independent of the shape of the vessel 220. Still other advantages are that the alignment and mounting of a vessel is simplified. With a larger distance between straps, less torque is experienced in extreme conditions.

Connection of the vessel 120 and the vessel 220 to the carrier are substantially similar. Accordingly, for simplicity, only a method of connecting the vessel 220 is described herein. A method for connecting the vessel 220 to the carrier system includes providing a suspension system 210 including an annular bracket 212 having an outer peripheral portion 218 with multiple cutouts 214 and swages 216 extending radially outwardly therefrom and an inner peripheral portion 232 with multiple cutouts 228 and swages 230 extending radially inwardly therefrom and an inner perimeter 232 having a pre-tensioned flange 234; providing a vessel 220 having at least one domed end 240; fixedly securing the cutouts 228 and swages 230 of the bracket 212 to the domed end 240 of the vessel 212; removably securing the pre-tensioned flange 234 of the bracket 212 to the vessel 220; and connecting the vessel 220 to the carrier system.

An advantage of the method for connecting a vessel to a carrier system is that this decoupling of the suspension bracket from the vessel shape avoids manufacturing tolerance dependency while compensating for vessel expansion due to increased pressure. Further, the bracket provides a system for accurately defining a connection surface for easy assembling. Additionally, this suspension system 210 may be used with any shaped vessel. Further, the bracket 212 may be used to attach additional components such as valve protection, line fixation, and stone shield connections. This suspension system 210 advantageously compensates for manufacturing tolerance of any vessel while compensating for vessel expansion. Thus mounting of the vessel to a carrier system is independent of the vessel shape. Still other advantages are that the alignment and mounting of a vessel is simplified. With a larger distance between straps, less torque is experienced in extreme conditions.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A suspension system for connecting a hollow pressure vessel to a carrier system comprising:

an annular bracket; and
an outer peripheral portion of the bracket having an annular array of substantially radially outwardly extending wings adapted to secure the bracket to the hollow pressure vessel,
wherein the annular bracket includes an inner flange formed on an inner peripheral portion of the bracket, the inner flange adapted to be pre-tensioned against a domed end of the hollow pressure vessel for removably securing the bracket to the hollow pressure vessel.

2. The suspension system of claim 1, wherein the bracket is adapted to be secured to the vessel with radial lamination about the wings.

3. The suspension system of claim 1, further comprising a supporting surface extending between an inner peripheral portion of the bracket and the outer peripheral portion and a strap adapted to be secured to the carrier system and abutting the supporting surface adapted for connecting the hollow pressure vessel to the carrier system.

4. The suspension system of claim 1, wherein the bracket includes a fastener connection adapted for securing the hollow pressure vessel to the carrier system.

5. The suspension system of claim 1, wherein the substantially radially outwardly extending wings are substantially flexible.

6. A suspension system for connecting a vessel to a carrier system comprising:
an annular bracket; and
an outer peripheral portion of the bracket having an annular array of substantially radially outwardly extending wings adapted to secure the bracket to the vessel,
wherein the bracket includes an annular interior metal ring seated within the bracket having at least two thread holes for receiving fasteners adapted for securing the vessel to the carrier system.

7. A suspension system for connecting a vessel to a carrier system comprising:
an annular bracket; and
an outer peripheral portion of the bracket having an annular array of substantially radially outwardly extending wings adapted to secure the bracket to the vessel,
wherein an inner peripheral portion of the bracket includes an annular array of substantially radially inwardly extending wings adapted to abut an end of the vessel.

8. The suspension system of claim 7, wherein the annular array of substantially radially outwardly extending wings are substantially flexible and the substantially radially inwardly extending wings are substantially flexible.

9. A pressure vessel system for connecting to a carrier system comprising:
a hollow pressure vessel having a domed end; and
a suspension system including an annular bracket having an inner peripheral portion and an outer peripheral portion, the inner peripheral portion of the bracket forming an aperture and the outer peripheral portion of the bracket having an annular array of substantially radially outwardly extending wings seeming the bracket to the domed end of the hollow pressure vessel,
wherein the annular bracket includes an inner flange formed on the inner peripheral portion, the inner flange pre-tensioned against the domed end of the hollow pressure vessel for removably securing the bracket to the hollow pressure vessel.

10. The pressure vessel system of claim 9, wherein the bracket is secured to the hollow pressure vessel with radial lamination about the wings.

11. The pressure vessel system of claim 9, further comprising a supporting surface extending between the inner peripheral portion and the outer peripheral portion and a strap secured to the carrier system and abutting the supporting surface for connecting the hollow pressure vessel to the carrier system.

12. The pressure vessel system of claim 9, wherein the bracket includes a fastener connection for securing the hollow pressure vessel to the carrier system.

13. The pressure vessel system of claim 9, wherein the substantially radially outwardly extending wings are substantially flexible.

14. A pressure vessel system for connecting to a carrier system comprising:
a vessel having a domed end; and
a suspension system including an annular bracket having an inner peripheral portion and an outer peripheral portion, the inner peripheral portion of the bracket forming an aperture and the outer peripheral portion of the bracket having an annular array of substantially radially outwardly extending wings securing the bracket to the domed end of the vessel,
wherein the bracket includes an annular interior metal ring seated within the bracket having at least two thread holes for receiving fasteners for securing the vessel to the carrier system.

15. A pressure vessel system for connecting to a carrier system comprising:
a vessel having a domed end; and
a suspension system including an annular bracket having an inner peripheral portion and an outer peripheral portion, the inner peripheral portion of the bracket forming an aperture and including an annular array of substantially radially inwardly extending wings abutting an end of the vessel, and the outer peripheral portion of the bracket having an annular array of substantially radially outwardly extending wings securing the bracket to the domed end of the vessel,
wherein the substantially radially inwardly extending wings are substantially flexible and the substantially radially outwardly extending wings are substantially flexible.

16. A method for connecting a vessel to a carrier system comprising the steps of:
providing a suspension system including an annular bracket having an outer peripheral portion with an annular array of substantially radially outwardly extending wings adapted to secure the bracket to the vessel and an inner peripheral portion having a pre-tensioned flange;
providing the vessel having a domed end;
fixedly securing the wings of the bracket to the domed end of the vessel;
removably securing the pre-tensioned flange of the bracket against the domed end of the vessel; and
connecting the vessel to a carrier system.

17. The method of claim 16, wherein the bracket includes a supporting surface extending between the inner peripheral portion and the outer peripheral portion and a strap secured to the carrier system and abutting the supporting surface for connecting the vessel to the carrier system.

18. The method of claim 16, wherein the bracket includes an annular interior metal ring seated within the bracket having at least two thread holes for receiving fasteners for securing the vessel to the carrier system.

19. The method of claim 16, wherein the bracket includes a releasable fastener connection for securing the vessel to a carrier system.

20. The method of claim 16, further comprising the step of securing the bracket to the vessel with radial lamination about the wings.

\* \* \* \* \*